UNITED STATES PATENT OFFICE.

WILHELM BERGDOLT, OF LEVERKUSEN, NEAR COLOGNE, GERMANY, ASSIGNOR TO FARBENFABRIKEN VORM. FRIEDR. BAYER & CO., OF ELBERFELD, GERMANY, A CORPORATION OF GERMANY.

NEW DYE.

1,014,633.  Specification of Letters Patent.  Patented Jan. 16, 1912.

No Drawing.  Application filed July 28, 1910.  Serial No. 574,372.

*To all whom it may concern:*

Be it known that I, WILHELM BERGDOLT, doctor of philosophy, chemist, citizen of the German Empire, residing at Leverkusen, near Cologne, Germany, have invented new and useful Improvements in New Dye, of which the following is a specification.

My invention relates to the manufacture and production of new substantive azo dyes which can be obtained by combining the tetrazo compounds from para-phenylenediamin - azo - 2 - amino - 5 - naphthol -7-sulfonic acid with one molecule of an azo dyestuff component, especially phenol, resorcin, aminophenol, or a meta-diamin and with one molecule of 2-amino-5-naphthol-7-sulfonic acid.

The new dyes are in the shape of their alkaline salts dark powders which are soluble in water generally with a blue color and which are soluble in concentrated sulfuric acid with a blue color. They dye cotton from blue to black shades. When on fiber they can be combined with diazo compounds. Generally black shades are thus obtained. These shades can be discharged to a pure white.

150 parts of para-aminoacetanilid are diazotized and introduced at 0° C. into a solution of 207 parts of sodium carbonate and 261 parts of sodium salt of 2-amino-5-naphthol-7-sulfonic acid. The combination is complete after a short time. In order to eliminate the acetyl group 2500 parts of caustic soda lye (30 per cent.) are added to the mixture which is heated to boiling for some time. The saponified compound is then tetrazotized in the usual way by acidulating, adding 300 parts of HCl (19.5° Bé.) and 138 parts of sodium nitrite and to the resulting tetrazo compound a cooled solution of 94 parts of phenol and 350 parts of sodium carbonate in 1000 parts of hot water is added. To the intermediate compound a cooled solution of 260 parts of 2-amino-5-naphthol-7-sulfonic acid and 150 parts of sodium carbonate is added. The combination is complete after a short time. The new dye is salted out, filtered off and dried.

The following formulæ will illustrate the formation of the dyestuff:

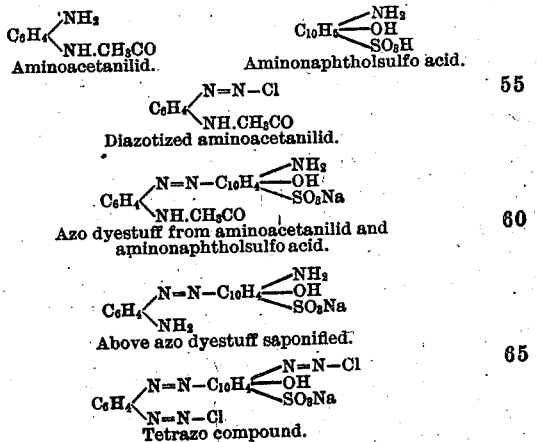

which is finally combined with 1 molecule phenol and 1 molecule 2-amino-5-naphthol-7-sulfonic acid which take the place of the two chlorin atoms in the formula of the tetrazo compound, the presence of the chlorin atoms being due to the diazotation in hydrochloric acid solution.

The new dye is in the shape of its sodium salt a dark powder which is soluble in water with a blue color. It dyes cotton black shades. By treating in the usual way the dyed goods with diazotized para-nitranilin a black is obtained which can be discharged to a pure white with hydrosulfites. By reduction with stannous chlorid and hydrochloric acid the dye is split up. Paraphenylenediamin, 2.6-diamino-5-naphthol-7-sulfonic acid and aminophenol are thus obtained.

Instead of phenol, resorcin, meta-aminophenol, meta-phenylenediamin or their derivatives may be used.

I claim:—

1. The herein described azo dyestuffs obtainable from tetrazo compounds, for which 2-amino-5-naphthol-7-sulfonic acid has been employed as coupler, which dyestuffs are in the shape of their alkaline salts dark powders soluble in water generally with a blue color, soluble in concentrated sulfuric acid with a blue color; dyeing cotton from blue to black shades, which can be developed on fiber with diazo compounds generally black shades being obtained which can be discharged to a pure white and yielding upon reduction with stannous chlorid and hydrochloric acid, 2.6-diamino-5-naphthol-7-sulfonic acid, substantially as described.

2. The herein described azo dyestuff obtainable from para-aminoacetanilid, 2.5.7-aminonaphthol sulfonic acid and phenol which is in the shape of its sodium salt a dark powder soluble in water with a blue color, dyeing cotton blue shades, which can be combined with diazotized para-nitranilin black shades being obtained, which can be discharged to a pure white and yielding upon reduction with stannous chlorid and hydrochloric acid para-phenylenediamin, 2.6-diamino-5-naphthol-7-sulfonic acid and aminophenol, substantially as described.

In testimony whereof I have hereunto set my hand in the presence of two subscribing witnesses.

WILHELM BERGDOLT. [L. S.]

Witnesses:
 CHAS. J. WRIGHT,
 WALTER VONNEGUT.